United States Patent [19]

Filion et al.

[11] Patent Number: 5,269,559
[45] Date of Patent: Dec. 14, 1993

[54] HORN ACTUATOR INCORPORATING A TRANSDUCER IN A STEERING WHEEL

[75] Inventors: Scott Filion, Newmarket; Colin Frost, Dover; Denis Moore, Rollingsford, all of N.H.

[73] Assignee: Davidson Textron Inc., Dover, N.H.

[21] Appl. No.: 875,390

[22] Filed: Apr. 29, 1992

[51] Int. Cl.$^5$ .............................. B60R 21/16
[52] U.S. Cl. ........................ 280/728; 200/61.54
[58] Field of Search ......... 280/728, 731, 743, 728 B, 280/731, 730 R; 200/61.54, 61.55

[56] References Cited

U.S. PATENT DOCUMENTS

| | | | |
|---|---|---|---|
| 4,575,117 | 3/1986 | Uchida | 280/750 |
| 4,934,735 | 6/1990 | Embach | 280/731 |
| 5,002,306 | 3/1991 | Hiramitsu et al. | 280/731 |
| 5,062,663 | 11/1991 | Satoh | 280/728 B |

FOREIGN PATENT DOCUMENTS 0301461 12/1989 Japan .

Primary Examiner—Margaret A. Focarino
Assistant Examiner—Paul Dickson
Attorney, Agent, or Firm—Reising, Ethington, Barnard, Perry & Milton

[57] ABSTRACT

A steering wheel (12) incorporates an air bag unit (22). The air bag unit has a cover door (30) with a transducer (38) molded in a deformable front wall (35) of the cover door. The transducer is operably connected to an electrical circuit (42) that actuates a horn (44) when the circuit senses an actuating output voltage at the output lead (41) of the transducer (38). The transducer produces the actuating output voltage when hand pressure is exerted on the front wall (35).

1 Claim, 3 Drawing Sheets

HORN ACTUATOR INCORPORATING A TRANSDUCER IN A STEERING WHEEL

TECHNICAL FIELD

This invention relates to a steering wheel incorporating a horn actuator within an air bag unit.

BACKGROUND OF THE INVENTION

Steering wheels because of their convenient location have often incorporated switches that actuate various motor vehicle accessories such as speed controls or horns. Steering wheels are also the most convenient location for mounting a driver side air bag. The air bag is often mounted at the hub of the steering wheel.

The incorporation of air bag units within a steering wheel have made the inclusion of horn or other actuating switches within the steering wheel more complicated. Firstly, the air bag unit with its casing and cover door occupy a significant portion of the area within the steering wheel rim. Secondly, the cover door must be free to open upon expansion of the air bag.

Consequently, the horn switch which has traditionally been a relatively large centrally located button at the hub of the steering wheel has been relocated away from the hub and downsized to fit within the remaining space within the rim about the air bag cover door. However, due to the historically conventional practice of locating a horn switch at the hub of a steering wheel, most drivers still feel more comfortable with a horn switch at the hub, particularly when faced with a panic situation. The conspicuous presence of a large pad at the hub further confuses drivers into mistakenly believing that the pad is the horn button.

What is needed is a steering wheel having an actuator switch incorporated within the air bag cover door at the hub of the steering wheel.

SUMMARY OF THE DISCLOSURE

In accordance with one aspect of the invention, a steering wheel for a motor vehicle includes an air bag unit having a gas generator within a casing. An air bag is operably affixed to the casing for receiving gas from said gas generator. A cover door is mounted over the air bag for concealing the air bag during its stored inactive state. The cover door has a front wall section made from a deformable material.

A thin film transducer is mounted to or within the front wall section and normally produces a first non-actuating output voltage. The transducer is constructed to undergo the same deformation as the front wall section and is electrically responsive to the deformation due to hand pressure exerted on the deformable front wall section for producing a second actuating voltage. The transducer is operably connected to an electrical circuit that is in turn operably connected to an electrical device such as a horn. The electrical device is actuated by said electrical circuit when said transducer produces said second actuating voltage.

In one embodiment, the transducer is a force sensitive variable resistor that has its resistance change upon pressure exerted on the deformable wall section. The change of resistance changes the resistor's output voltage. In another embodiment, the transducer is in the form of a piezoelectrical device which transforms mechanical pressure exerted on the deformable front section into an output voltage that is transmitted to said electrical circuit.

A broader aspect of the invention relates a thin film transducer mounted in proximity to a hub of a steering wheel and mounted to a deformable surface. The transducer, which can be in the form of a force sensitive variable resistor or a piezoelectrical device, is sensitive to pressure placed upon the deformable surface to produce an actuating voltage which is transmitted to an actuating electrical circuit that in turn is operably connected to an electrical device such as a horn.

In this fashion, the electrical circuit and electrical device may be mounted remote from the steering wheel. Furthermore, the transducer or its leads are not separable from the door upon any severe or sudden impacts. The deformable front wall section maintains its ability to function as a cover door for an air bag unit.

BRIEF DESCRIPTION OF THE DRAWINGS

Reference now is made to the accompanying drawings in which.

DETAILED DESCRIPTION OF THE PREFERRED EMBODIMENTS

Figure 1:
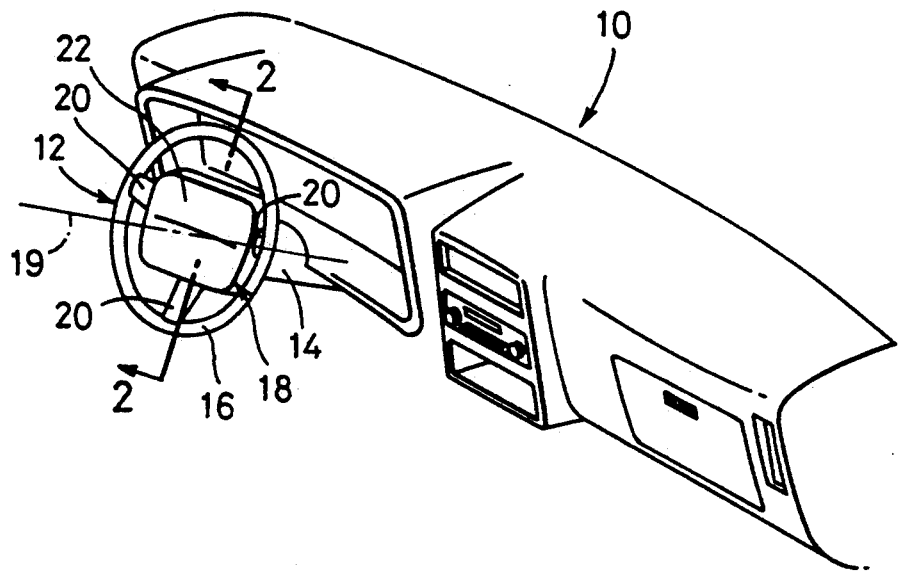
FIG. 1 is a perspective view of a motor vehicle dashboard incorporating a steering wheel in accordance with the invention.
Figure 2:
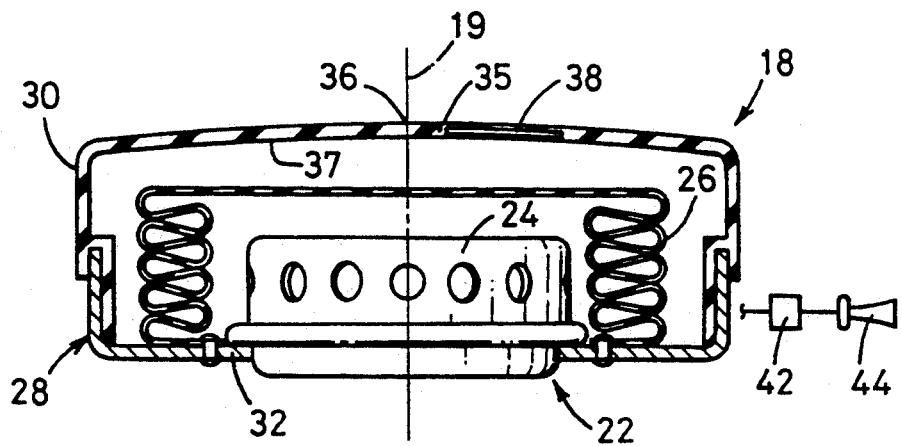
FIG. 2 is a partially schematic and cross-sectional view taken along lines 2—2 shown in FIG. 1.
Figure 3:
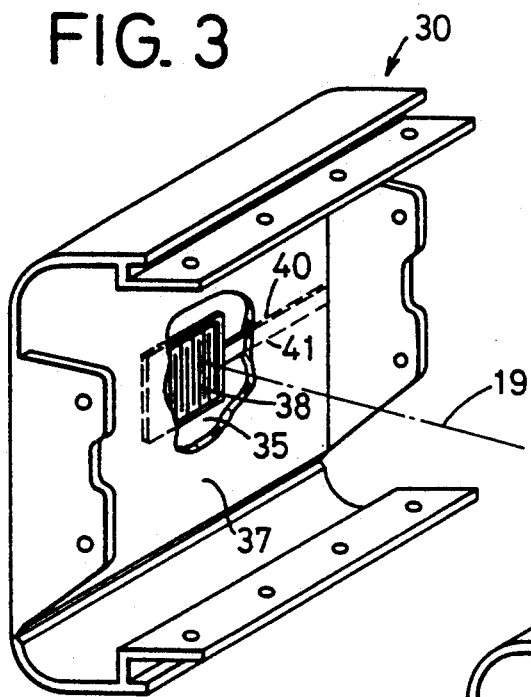
FIG. 3 is a rear perspective and partially segmented view of the cover door with the molded-in thin film variable resistor shown.

As shown in FIG. 1, a motor vehicle dashboard 10 includes a steering wheel 12 mounted at the upper end of a steering column 14. The steering wheel 12 has a rim 16 attached to a hub section 18 via a plurality of spokes 20. The hub 18 is mounted at the central axis 19 of the steering column 14. As shown in FIG. 2, the hub section 18 incorporates an air bag unit 22 with a gas generator 24 and an air bag 26 operably connected about the gas generator to receive any gas emanating from the generator. The gas generator 24 and air bag 26 are mounted inside a casing 28. The casing 28 includes a bottom half 32 and a cover door 30 that is mounted to the bottom half 32 and is normally closed to conceal the casing bottom half 32, gas generator 24 and air bag 26.

The cover door 30 is molded from semi-flexible TPE, TPO or similar plastic material. The door 30 includes a deformable front wall section 35 that has a conventional tear seam 36 which provides the door 30 to open upon deployment of the air bag unit 22.

The door 30 also includes a force sensitive variable resistor 38 molded therein. A suitable variable resistor is available from Interlink Electronics under the brand name FSR. Other thin film strain gauges are also suitable to function as a variable resistor.

Suitable input lead 40 and output lead 41 extend from the resistor 38 to the exterior of the cover door 30 and are operably connected to an electrical circuit 42 which is in turn operably connected to a horn 44. The electrical circuit is constructed to provide a constant input voltage to input lead 40 and is also constructed to actuate horn 44 upon sensing an appropriate output voltage from the variable resistor 38 in output lead 41.

In operation, an operator merely presses the deformable front wall section 35 when the horn is desired. The pressing of the front wall 35 deforms the wall 35 inwardly and also stress and deforms the force sensitive variable resistor molded therein. The variable resistor electrically reacts to this stress and changes it electrical resistance. The output lead 41 which produced a first non-actuating voltage based upon the constant input voltage on input lead 40 now produces a second actuating voltage which is sensed by the electrical circuit which then actuates horn 44.

Figure 4:
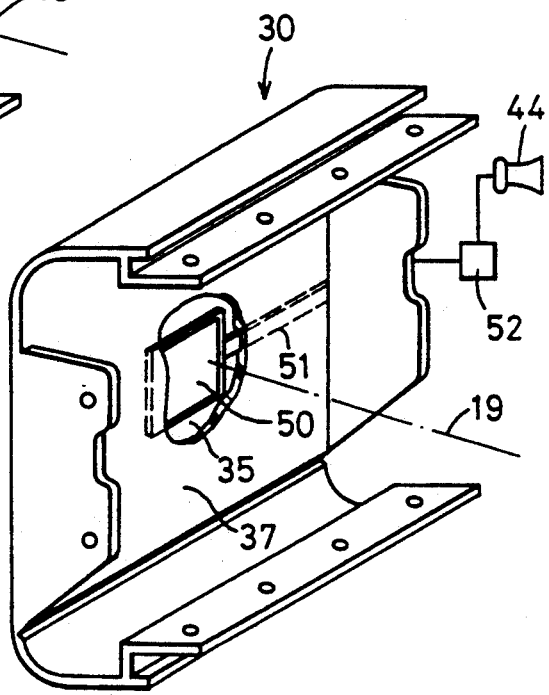
FIG. 4 is a view similar to FIG. 3 illustrating a piezoelectrical thin film device molded therein.

Referring now to FIG. 4, a thin film piezoelectrical device 50 is substituted for the variable resistor. The piezoelectrical device 50 produces a voltage when a mechanical stress or pressure is exerted thereon. Its output lead 51 is operably connected to an electrical circuit 52 that is connected to horn 44. The electrical circuit 52 senses the produced voltage by the stressed piezoelectrical device to actuate the horn 44.

Figure 5:
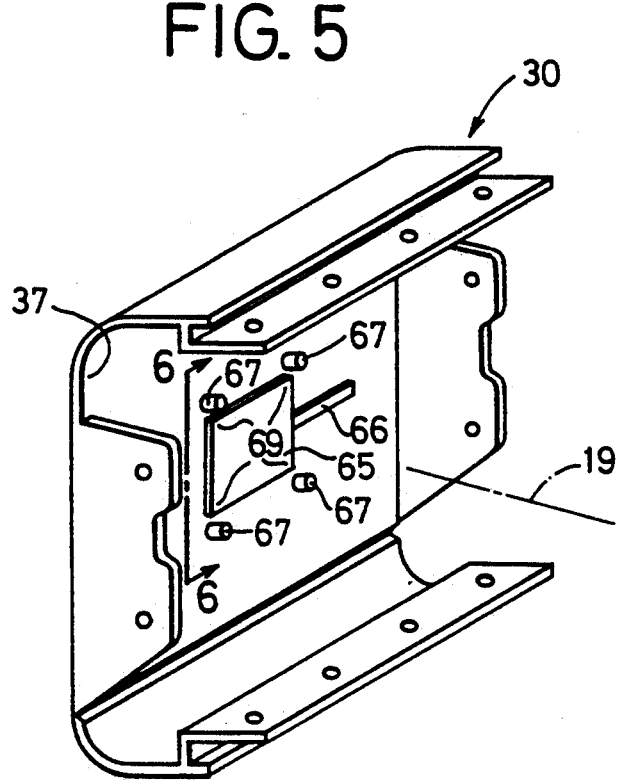
FIG. 5 is a view similar to FIG. 3 illustrating another embodiment.
Figure 6:
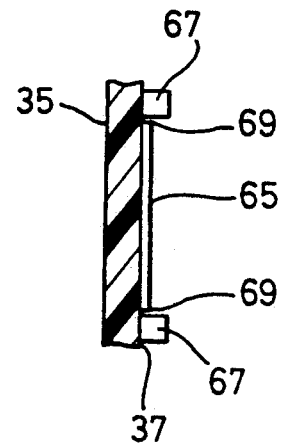
FIG. 6 is a cross-sectional view taken along lines 6—6 shown in FIG. 5.

Both the variable resistor and piezoelectrical device can be positioned at the central axis 19 of the hub 18. Furthermore, instead of being molded into the front wall section 35, they both may be adhered to the inside surface 37 of the wall section 35. As shown in FIGS. 5 and 6, a thin film transducer member 65, is adhered to inside surface 37. The adhesive used to bond the member 65 to surface 37 may be a urethane moisture cured base or a pressure sensitive adhesive. Standoff protrusion 67 extends rearwardly from the inside surface 37 to protect and space the member 65 from any direct contact with parked material of the air bag 26. The protrusions may extend about 3/16 inch for a member 65 having 1½ inch sides. The protrusions 67 are preferably located near the corners 69 of the member 65. Other locations such as near the middle of each edge 71 is also suitable. The protrusions can be integrally molded with the front wall section 35. The protrusion can be any cross-sectional shape and may be ridgelike and circumscribe member 65. The member 65 has its output leads 66 operably connected to an electrical circuit (not shown). The member 65 similar to transducers 38 or 50 is sensitive to band pressure applied to the front wall section 35.

Figure 7:
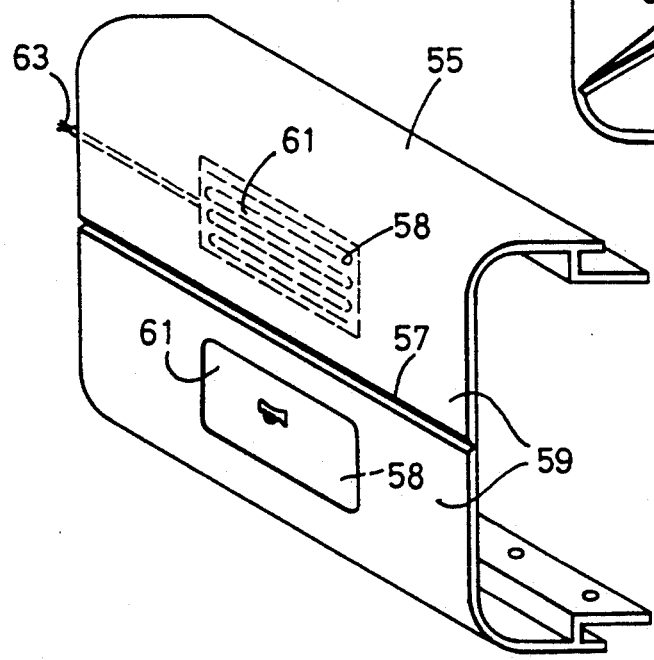
FIG. 7 is a front perspective view illustrating another embodiment in accordance with the invention.

Referring now to FIG. 7, a door cover 55 has a central tear seam 57 with two transducers 58 embedded in a deformable front wall section 59 about each side of the seam 57. The front wall may have sections 61 that can be embossments or recesses or other indication to designate the location of the transducers. The transducers, either a variable resistor or piezoelectrical device, are thin film devices that react to pressure exerted on the sections 61. Each transducer 58 has its output lead 63 operably connected to an electrical circuit (not shown).

Other variations and modification of the invention are possible without departing from its scope and spirit as defined by the appended claims.

The embodiments in which an exclusive property or privilege is claimed are defined as follows:

1. In a cover door for an air bag unit for use in a steering wheel of a motor vehicle having an actuating mechanism for an electrical device, said actuating mechanism having the improvement comprising:

a front wall section having an inside surface deformable upon hand pressure being exerted on said front wall section;

a tear seam in said front wall section;

a transducer secured by an adhesive layer to said inside surface on one side of said tear seam such that said transducer does not overlie said tear seam, said transducer being constructed to undergo the same deformation as said front wall section due to hand pressure exerted thereon; and a plurality of protrusions located about said transducer and extending rearwardly from said inside surface past said transducer to thereby prevent an air bag located behind said front wall section from contacting said transducer;

said transducer exhibiting a detectable characteristic in the absence of pressure being exerted on said front wall section and said transducer being responsive to deformation of said front wall section to provide a measureable change in said characteristic;

said transducer being operably connected to an electrical circuit that is connected to an electrical device such that said electrical device is operable upon said measureable change being detected by said electrical circuit.

* * * * *